(No Model.) 3 Sheets—Sheet 1.
E. E. WHIPPLE.
HARROW.
No. 538,139. Patented Apr. 23, 1895.
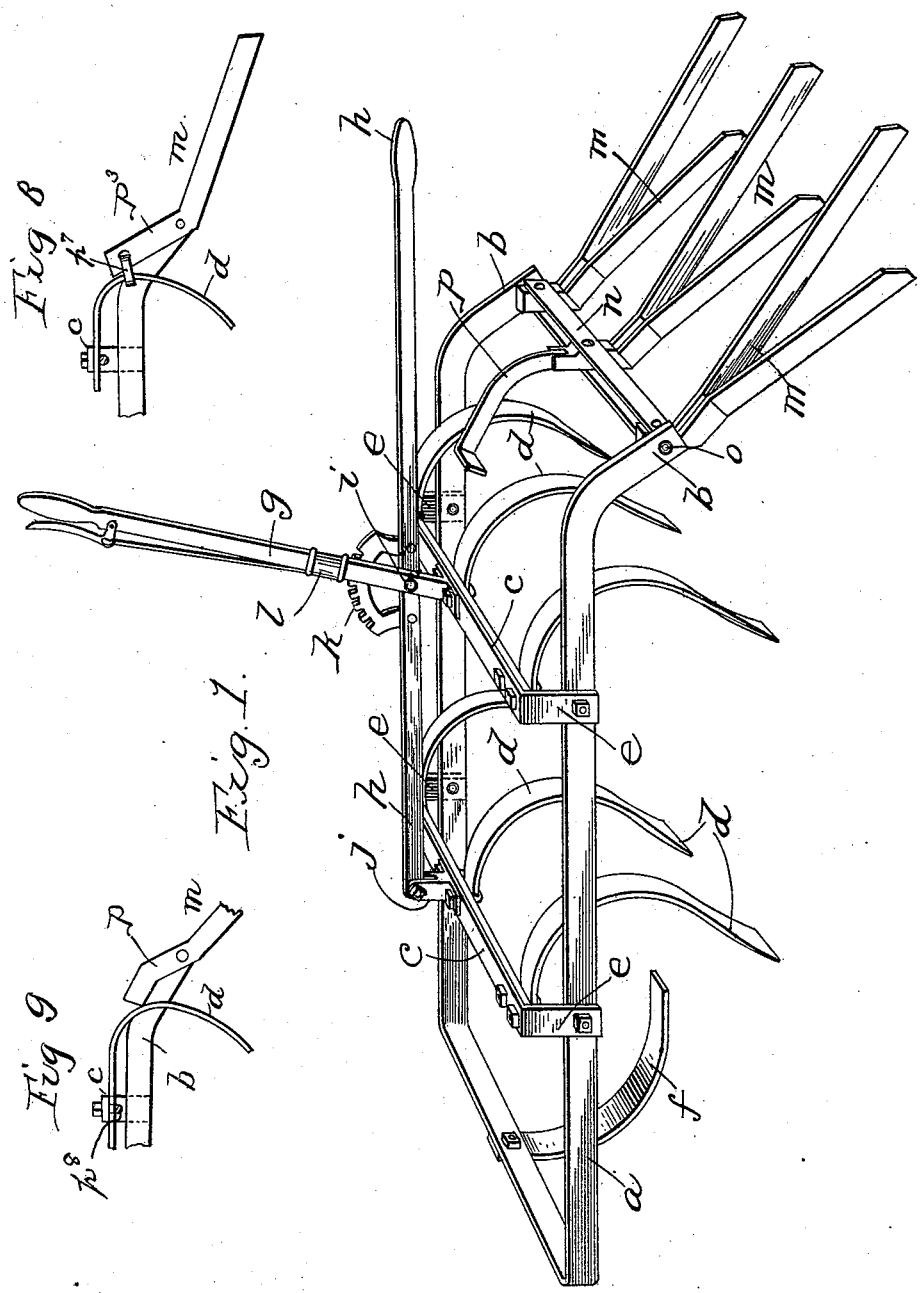
WITNESSES:
INVENTOR
E. E. Whipple
BY O. E. Duff
ATTORNEY.

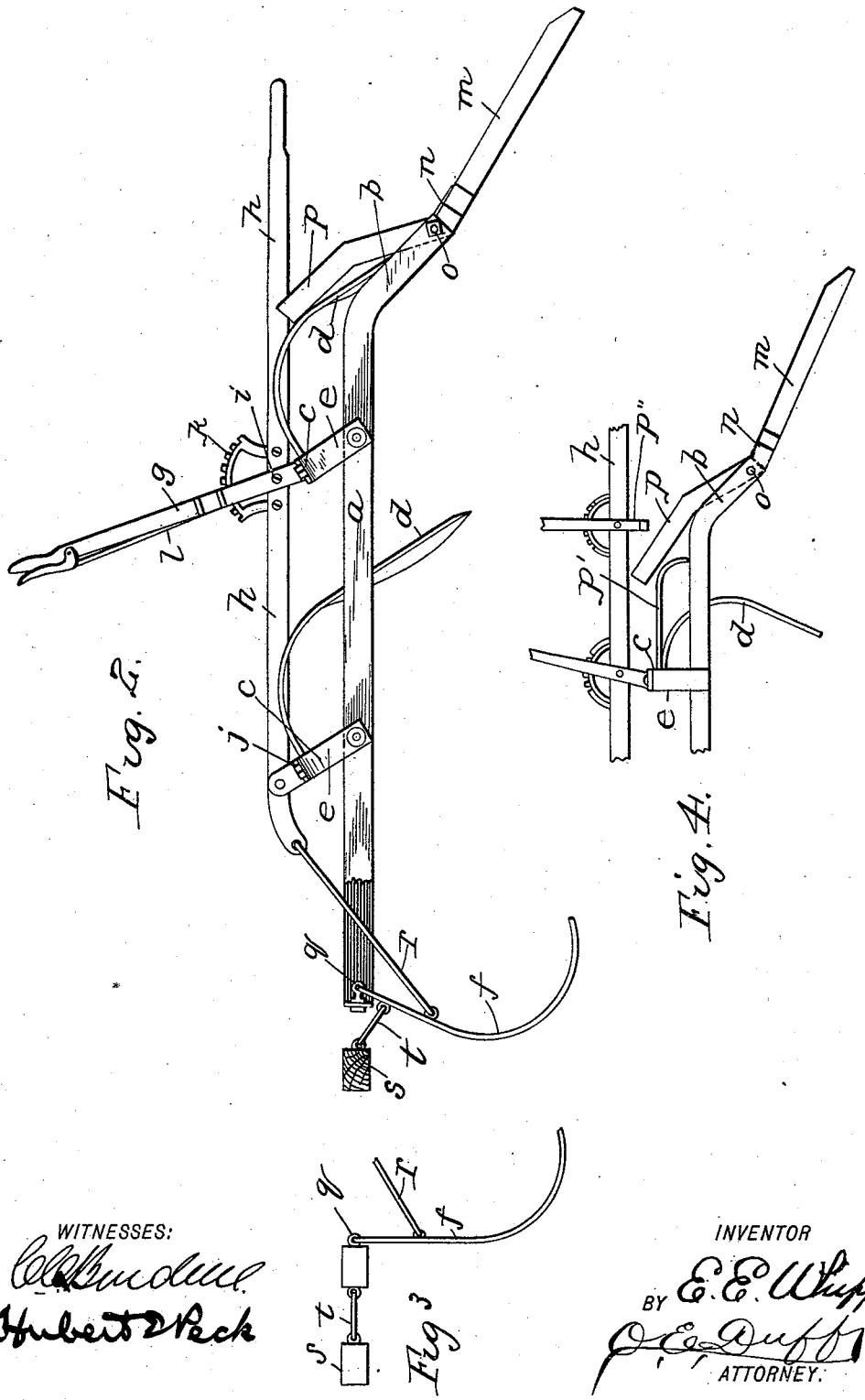

(No Model.) 3 Sheets—Sheet 3.
E. E. WHIPPLE.
HARROW.
No. 538,139. Patented Apr. 23, 1895.
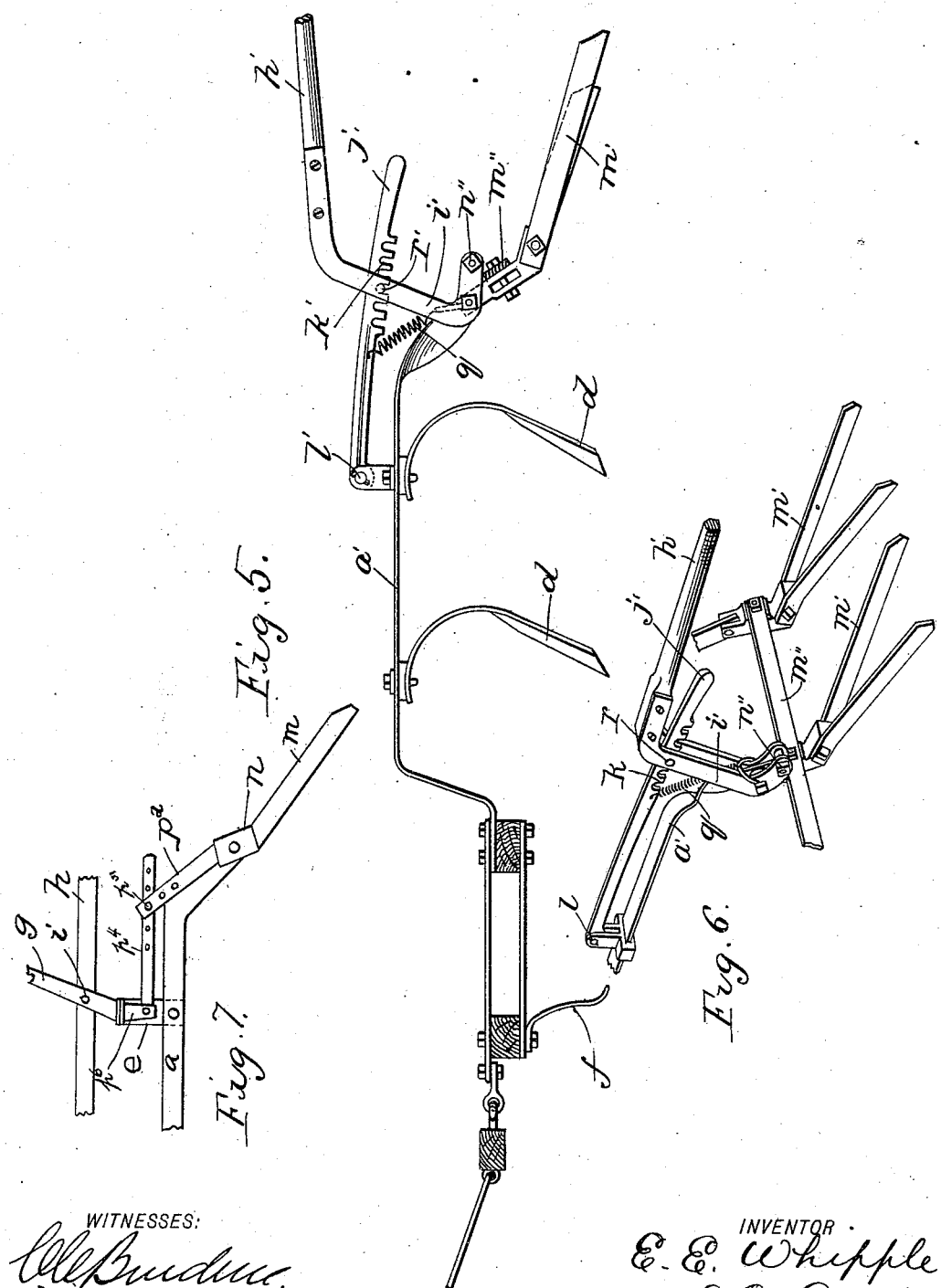
WITNESSES:
INVENTOR
E. E. Whipple
BY
ATTORNEY.

UNITED STATES PATENT OFFICE.

EFFINGER E. WHIPPLE, OF ST. JOHN'S, MICHIGAN.

HARROW.

SPECIFICATION forming part of Letters Patent No. 538,139, dated April 23, 1895.

Application filed January 3, 1894. Serial No. 495,529. (No model.)

*To all whom it may concern:*

Be it known that I, EFFINGER E. WHIPPLE, of St. John's, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows.

The object of the invention is to provide an improved harrow having supports freely movable downwardly, so that said supports will be always in engagement with the surface of the ground, as the teeth of the harrow are passing over obstructions, or, as they rise and fall by reason of the uneven surface of the ground being worked, thereby preventing the harrow jumping and wabbling.

A further object of the invention is to provide an improved adjustable spring tooth harrow having its rear supports freely movable vertically, so that said supports will be always in engagement with the ground.

A further object of the invention is to provide an improved adjustable spring tooth harrow having freely movable supports automatically operated by the adjustment of the teeth, so that when the teeth are adjusted to cut deep the supports move up to rest on the surface of the ground, and when the teeth are raised the supports will be thrown down so as to engage the ground and gage the cutting depth of the teeth, or supports the harrow so that the teeth will not engage the surface of the ground.

A further object of the invention is to provide an adjustable tooth harrow having the front supports and rear knives vertically adjustable and so arranged and connected as to be operated by the adjustment of the teeth so that when the teeth are adjusted to cut deep the said supports and knives can be moved up and when the teeth are adjusted to work shallow the said knives and supports are thrown down.

A further object of the invention is to provide an improved adjustable harrow having the vertical adjustable front shoe operated by the adjustment of the teeth.

A further object of the invention is to provide an adjustable tooth harrow having the front shoe vertically adjustable and connected with and operated by the adjustment of the teeth and wherein the draft is attached to said shoe so as to help to draw the same down and thereby assist in raising the harrow when the adjustment is desired.

A further object of the invention is to provide an improved adjustable tooth harrow having the rearwardly extending handle connected to the tooth beams and forming in connection with the adjusting lever of the tooth beams a lock to hold the beams in the desired position.

A further object of the invention is to provide an improved harrow having the rocking tooth beam carrying the teeth provided with downwardly extending ends pivoted to the harrow frame to increase the strength of the harrow and render the same more rigid.

A further object of the invention is to provide an improved harrow having the frame provided with downwardly extended ends to which the swinging rear supports are pivoted.

The invention consists in certain novel features of construction and in combination of parts more fully pointed out and particularly described hereinafter.

Referring to the accompanying drawings, Figure 1 shows in perspective one section of the improved harrow, the teeth being adjusted to cut deep, the vertically movable rear supports or knives being shown and a rigid front shoe being shown. Fig. 2 is a side elevation of the improved harrow, parts being broken away, showing the operating lever swung forward and the teeth up and back and the rear supports thrown down, the harrow being shown provided with a vertically adjustable front shoe having the draft attached thereto. Fig. 3 is a detail view showing the front end of the improved harrow having the vertically adjustable front support or shoe and the draft attached to the frame instead of the shoe as shown in Fig. 2. Fig. 4 is a detail view of the rear end of the improved harrow showing a tooth beam provided with an arm to operate the rear supports or knives and also showing an adjustable stop to limit the downward swing of the said rearward support. Fig. 5 is a side elevation of a rigid tooth harrow provided with my invention of the freely movable rear supports. Fig. 6 is a detail perspective view of the rear portion of said harrow showing the manner of limiting the upward movement of the rear support and adjacent parts. Fig. 7 is a detail elevation of the rear portion of a harrow showing an adjustable connection between the vertically movable rear knives and one of the tooth beams arranged to positively move the knives in an opposite direction to that of the teeth. Fig. 8 is a detail elevation of the rear portion of a harrow showing the swinging knives loosely connected to one of the rear teeth. Fig. 9 is a detail elevation of the rear portion of a harrow showing one of the rear knives adjustably secured to the tooth beams to permit forward adjustment thereof to vary the throw of the rear knives.

Referring to Figs. 1 to 4, inclusive, $a$, indicates a U-shaped frame having the rear downwardly and rearwardly extending ends $b$. $c$, indicates the tooth beams extending transversely of and above this frame. Each tooth beam is strongly constructed and has its ends $e$, bent downwardly preferably, at an angle of about ninety degrees and at their lower portions pivoted to the sides of the frame $a$. This construction renders the tooth beam approximately U-shaped in form and by reason of this peculiar shape of the tooth beam the strength and rigidity of the harrow are greatly increased and the main portions of the beams are raised a distance above the plane of the frame and above the fulcrumed or pivoted points of the beams, so that the points of the harrow teeth $d$, attached to said beam are given a great range of play and adjustment. A harrow frame having this tooth beam is not so liable to twist or get out of shape as where straight beams are employed journaled at their ends in the side of the frame so that the frame and beams are approximately in the same horizontal plane.

$h$, indicates a rearwardly extending handle extending over the tooth beam and at its front end pivoted to the front beam by means of vertical lug $j$.

$g$, indicates the upwardly extending adjusting lever of the harrow at its lower end rigidly secured to one of the tooth beams to which the handle $h$, is not otherwise pivotally joined, said lever being pivotally joined to the handle $h$, at the point $i$. The handle carries the rack $k$, at the side of said lever and the lever is provided with the clip and pawl $l$, as shown so that the handle $h$, and the lever $g$, can be relatively locked against independent movement thereby locking the tooth beams in the desired positions. As only two tooth beams are shown in the present drawings the lever $e$, is rigidly attached to the rear tooth beam and the handle $h$, is pivoted to the lug $j$, on front tooth beam. However, where more than two tooth beams are employed the handle will be joined to all of the tooth beams except one, by means of the lugs $j$ or similar devices. It will be evident that when the lever $g$, is swung forward it will rock the tooth beams $c$, forward through the medium of the handle $h$, and will thereby swing the teeth rearwardly and upwardly so that they will be raised entirely from the ground or will cut very shallow or merely graze the surface of the ground. This adjustment of the teeth is shown in Fig. 2. When the lever $g$, is thrown back the tooth beams will be thrown rearwardly thereby carrying the points of the teeth $d$, downwardly and forwardly so that they will enter the ground and cut to a considerable depth.

$f$, indicates a front shoe or any suitable support attached to the front portion of the frame $a$. In Fig. 1, this shoe is shown rigidly attached to support the front end of the frame.

$m$, indicates any suitable rear support for the harrow. In the present instance these supports are shown as rearwardly and downwardly extending knives which serve to pulverize and break up the clods, &c., and to gage the cutting depth of the teeth. These supports or knives $m$, are at their upper ends rigidly attached to beams or a frame $n$, extending between the downwardly bent ends $b$, of the frame $a$, and pivoted therein, at $o$, so that all the knives can freely drop or move vertically together on the pivots or journals $o$.

Any suitable device is provided to operate the knives so that when the teeth $d$, are raised from the ground or to such a position as to work shallow the knives or supports $m$, will be thrown down so as to support the frame $a$, in such a position as to hold the teeth $e$, at the point desired. In Fig. 1, and other views of the drawings this device consists of an arm $p$, rigid with the rear supports $m$, and extending forwardly and upwardly therefrom and so arranged that when the teeth are thrown back and upwardly one of the teeth will engage said arm $p$, and will thereby throw the rear ends of the knives down as is clearly evident. It should be observed, however, that this arm $p$, or other operating mechanism for the rear supports that may be employed should be so arranged and located that the rear supports are free to drop so as to at all times engage and rest on the surface of the earth, particularly when the teeth $d$, are swung forward and down so as to cut a considerable depth beneath the surface of the earth in which case the supports freely drag along the upper surface of the ground. This independent movement of the rear support permits them to always rest on the surface of the ground whether the harrow is raised or going over obstructions or working uneven soil where if the knives were set or held rigidly the harrow would wabble and jump and the knives would part of the time be out of engagement with the ground. However, by arranging the knives so that they have an independent movement they are at all times in engagement with the ground and thereby steady the harrow and also serve to support the teeth at the proper point.

In Fig. 4, the rear tooth beam is shown provided with a rearwardly extending projection $p'$, arranged to engage the arm $p$, of the rear support and to operate the rear supports in the same manner as where the arm $p$, is engaged and operated by one of the teeth. In this view, Fig. 4, a suitable stop is also provided to limit the upward swing of the arm $p$, and thereby limit the downward swing of the rear ends of the knives. This support preferably consists of a vertically swinging lever $p''$ fulcrumed to the handle $h$, and provided with a rack to hold it in various positions so that the lever can be swung to and from the arm $p$, of the knives to vary the points at which the knives will be held in their downward movement.

In Figs. 2 and 3 the front support $f$, is also shown vertically movable. This is accomplished by pivoting or loosely joining the upper end of the shoe or other supports employed to the front portion of the harrow frame by means of the joints $q$. This support is thrown downwardly when the teeth are raised by means of a connection such as $r$, from the front end of the handle $h$, to the shoe or support at a point below the pivotal joint $q$, thereof. Thus when the teeth of the harrow are raised the said support $f$, will be thrown downward in unison with the rear support $m$, and when the teeth are thrown downwardly to cut deep into the ground the said front support $f$ is raised so as not to interfere with the downward cut of the teeth.

If desired the front evener or double tree $s$, to which the draft animals are attached can be attached to the supports $f$, at points beneath their pivotal joints $q$, by means of the connections $t$, or the like as shown in Fig. 2. By this means the draft can be employed to throw or draw the shoe $f$, downwardly when desired to raise the frame and teeth from the ground. However, I do not wish to limit myself to connecting the draft to the front support, as for instance in Fig. 3, the draft is shown connected to the front end of the frame as usual.

This invention is not limited to any peculiar construction or form of front and rear supports, although in the present case the front shoe and rear knives are shown. Also this invention is not limited to the employment of front supports vertically movable, but rigid front supports can be employed or if deemed advisable the front supports can be dispensed with, although I prefer to use them.

In Fig. 7, the arm $p^2$, controlling the knives is loosely and pivotally joined to the rear tooth beams by means of link $p^4$, said link at its front end being pivotally joined to the arm $p^6$ depending from the rear tooth beam. By this arrangement when the tooth beam is rocked to throw the teeth forward and down the connections $p^6$ $p^4$ and $p^2$ will throw the knives up and in the opposite direction when the teeth are thrown up. The arm $p^2$ and link $p^4$ can be provided with series of perforations substantially as shown so that the pivot pin $p^5$ uniting said arm and link can be placed in various sets of holes to control the throw of the knives or the limit of up and down movements thereof. By this arrangement the knives are held rigid in the position desired and are positively operated with, but in an opposite direction to the teeth.

In Fig. 8, the arm $p^3$ controlling the swinging knives is shown loosely connected to one of the movable harrow teeth by a suitable loose connection such as a loop $p^7$ carried by said arm and through which the tooth loosely passes so that as the tooth is raised or lowered the knives will be correspondingly lowered and raised. By means also the knives will be positively operated and held in the desired position.

In Fig. 9, the tooth operating the knives is adjustably held to the tooth beam by a clip $p^8$ and the tooth shank is so formed as to permit forward and rearward adjustment of said tooth to vary the throw of the knives.

In Figs. 5 and 6, a harrow composed of the rigid beams $a'$, extending in the line of draft and carrying the teeth $d$, is shown. The frame beams are rigidly connected at their front ends and to their downwardly bent rear ends the rear knives $m'$, are pivoted. These knives are rigidly secured together by cross bars $m''$, as shown, the knives being rigidly secured to blocks which are pivoted to the ends of the tooth beams and the cross bar $m'''$, extends across and is rigidly secured to the said block or holders of each set of knives, as clearly shown in Fig. 6.

$h'$, indicates a handle having the two separated parallel angle plates $i'$, rigidly secured thereto and extending downwardly therefrom, the lower end or nose $n''$, of said plate extending rearwardly over said cross bar as clearly shown. At their lower angle or elbow the said plates are located on opposite sides of the end of one of the tooth beams and the said plates are pivoted thereto so that the lever can swing vertically. A vertically movable latch $j'$, is provided to lock the lever or handle $h'$, in the desired vertical position. This latch is provided at $l'$, to one of the tooth beams. From thence it extends rearwardly between the plates of the handle over a transverse bolt $r'$, therein. The under side of the lever is provided with a series of notches $k'$, so that by raising the latch to free it from the bolt $r'$, the lever or handle $h'$, can be moved to the desired position and when the latch is released it will drop on to the bolt $r'$, which will enter one of the notches, the latch being held in the desired position by the spring $q'$. This locks the handle in the desired position so that the harrow section can be properly manipulated. It also determines the limit of upward swing of the knives $m'$, as the nose $n''$ of the handle plates extending over the cross bar $m''$ limits the upward swing of said knives by reason of the cross bar coming in engagement with the nose, but the knives are free to drop and play vertically up to said nose of the handle so that the knives still have the vertical independent play and can always remain in engagement with the upper surface of the ground. No matter what position the teeth of the harrow may assume or over what obstruction they may be passing the said knives will drop to the surface of the ground to perform their function.

It is evident that various changes might be made in the forms, arrangements and constructions of parts described without departing from the spirit and scope of my invention. Hence I do not wish to limit myself to the exact constructions herein set forth, but consider myself entitled to all such changes as fall within the spirit and scope of my invention.

Having thus fully described my invention, what I claim as new, and desire to secure by Letters Patent of the United States, is—

1. A harrow comprising the U-shaped main frame formed by the front bar and the rearwardly extending legs having their rear ends turned down, tooth beams extending between and secured to said legs, the rear gages carried by a holder mounted in and extending between said down turned ends, substantially as described.

2. A harrow having its frame formed with sides parallel to the line of draft, the transverse rocking tooth beams extending between said sides, each beam having its ends bent downwardly, substantially at right angles, and at the lower ends pivoted to the frame sides so that the beams between the frame sides are arranged above the frame, teeth secured to the beams above the plane of the frame, and means, substantially as described to rock the beams and lock them.

3. The harrow having the rocking tooth beams, the harrow handle projecting to the rear of the harrow and extending over and loosely joined to the beams to rock them together, and the operating lever rigidly secured to one of said beams and pivoted to the handle and provided with means to lock the lever and handle against independent movement.

4. A harrow having the vertically swinging rear pulverizing supports and the rocking harrow teeth controlling said supports and arranged to force the supports downwardly when the teeth are raised upwardly, substantially as described.

5. A harrow having the vertically adjustable teeth, and vertically movable supports controlled by the movements of the teeth and so arranged and controlled as to move up when said teeth are adjusted to work deep and to move down when the teeth are raised, substantially as described.

6. A harrow having the rear freely vertically movable knives, and adjustable means to limit the free swing of said knives substantially as described.

7. A harrow having vertically movable harrow teeth and a vertically movable front shoe connected with and moved by and in an opposite direction to the teeth, substantially as described.

8. A harrow having the vertically adjustable teeth, means for adjusting the same, and the freely vertically swinging rear knives having an arm arranged to be engaged when said teeth are raised to force said knives down, substantially as described.

9. The harrow having the rear vertically movable knives connected to swing together the pivoted handle having the angle plates extending over said knives to limit their upward swing, and means to lock the handle.

10. The harrow comprising the frame having the sides extending in the line of draft, the rocking tooth beams extending transversely of the frame and pivoted to the sides of the frame and provided with the teeth and operating means, a rocking holder pivoted to and extending between the rear ends of said frame and carrying the rearwardly extending knives controlled and operated by the tooth beams so as to be forced down by said tooth beams when adjusted to raise the teeth.

11. A harrow having the adjustable teeth and the vertically movable knives adjustably connected to move with and in an opposite direction to said teeth.

12. A harrow having the rocking tooth beams carrying the teeth, the swinging knives and an adjustable connection between said knives and said beams arranged to move the knives positively with the teeth and to hold the same in position, substantially as described.

13. In a harrow, the combination of a frame, rocking tooth beams, the swinging rear supports having an upwardly extending arm provided with a series of perforations, the link loosely connecting said arm to the rear tooth beam and provided with a series of perforations so that the pivot pin uniting the link and arm can be placed in different holes to vary the stroke of the supports, substantially as described.

In testimony that I claim the foregoing as my own I affix my signature in presence of two witnesses.

EFFINGER E. WHIPPLE.

Witnesses:
 FLORENCE PALMER,
 M. D. HUBBARD.